United States Patent
Sadano

(10) Patent No.: US 8,860,985 B2
(45) Date of Patent: Oct. 14, 2014

(54) IMAGE FORMING APPARATUS FOR REDUCING POWER CONSUMPTION USING A COMMONLY ACCESSIBLE SHARED MEMORY

(75) Inventor: Kohichi Sadano, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 460 days.

(21) Appl. No.: 13/042,622

(22) Filed: Mar. 8, 2011

(65) Prior Publication Data

US 2011/0222094 A1    Sep. 15, 2011

(30) Foreign Application Priority Data

Mar. 15, 2010  (JP) ................. 2010-058297

(51) Int. Cl.
*G06F 3/12* (2006.01)
*G06F 1/32* (2006.01)
*G03G 15/00* (2006.01)

(52) U.S. Cl.
CPC .......... *G06F 1/3284* (2013.01); *G03G 15/5075* (2013.01); *G06F 1/3209* (2013.01); *G06F 1/3203* (2013.01); *Y02B 60/1267* (2013.01)
USPC ...................................... 358/1.15

(58) Field of Classification Search
None
See application file for complete search history.

(56) References Cited

U.S. PATENT DOCUMENTS

2007/0183107 A1*  8/2007  Okada ............................ 361/62
2009/0147296 A1*  6/2009  Pandit et al. ................. 358/1.15
2010/0235500 A1*  9/2010  Shizuno ..................... 709/224

FOREIGN PATENT DOCUMENTS

| JP | 2000-284932 A | 10/2000 |
| JP | 2000-309142 A | 11/2000 |
| JP | 2002-218099 | 8/2002 |
| JP | 2006-164154 A | 6/2006 |
| JP | 2009-266088 | 11/2009 |

OTHER PUBLICATIONS

Japanese Office Action dated Oct. 22, 2013, issued in Japanese Patent Application No. 2010-058297.

* cited by examiner

*Primary Examiner* — Benny Q Tieu
*Assistant Examiner* — Sunil Chacko
(74) *Attorney, Agent, or Firm* — Oblon, Spivak, McClelland, Maier & Neustadt, L.L.P.

(57) ABSTRACT

An image forming apparatus operates in two modes of an energy saving mode and a normal mode. The image forming apparatus includes a shared memory that is capable of being referenced by a network interface card, which is detachably connected to the image forming apparatus, in the energy saving mode and the normal mode of the image forming apparatus; and an apparatus information saving unit that, when an apparatus state of the image forming apparatus is changed, saves image forming apparatus information regarding the apparatus state of the image forming apparatus in the shared memory. The network interface card includes an apparatus information acquisition unit that acquires the image forming apparatus information from the shared memory.

18 Claims, 9 Drawing Sheets

IMAGE FORMING APPARATUS FOR REDUCING POWER CONSUMPTION USING A COMMONLY ACCESSIBLE SHARED MEMORY

CROSS-REFERENCE TO RELATED APPLICATIONS

The present application claims priority to and incorporates by reference the entire contents of Japanese Patent Application No. 2010-058297 filed in Japan on Mar. 15, 2010.

BACKGROUND OF THE INVENTION

1. Field of the Invention

The present invention relates to an image forming apparatus.

2. Description of the Related Art

Heretofore, because of a concern about environmental issues, there is a demand for saving of power in an image forming apparatus. In general, in the image forming apparatus, of a power supply time, an operation time during which processing is actually performed is not necessarily great. For this reason, for a standby time when the apparatus waits for a job, an energy saving mode is executed to reduce power consumption.

In a recent image forming apparatus, with the spread of networks, as an interface with a PC, in addition to a USB being standard mounted, a network interface is standard mounted and a network interface card (NIC) is mounted optionally.

In an image forming apparatus with an NIC mounted optionally, a technique is known in which an energy saving mode function is provided in each of the image forming apparatus and the NIC so as to reduce power consumption.

For example, Japanese Patent Application Laid-open No. 2009-266088 describes a technique which, in an information processing apparatus in a power saving state, enables transmission of information regarding data to the outside while maintaining a power saving state even when there is a request to acquire information regarding data being managed by the information processing apparatus from the outside, for the sake of improving a power saving effect.

However, in the related art (Japanese Patent Application Laid-open No. 2009-266088), when there is a request to acquire information (for example, the mode of the image forming apparatus, error, a residual ink (toner) quantity, a counter, the state of a sheet feed/discharge tray, and the like) of the image forming apparatus from the outside while the image forming apparatus and the NIC are both in the energy saving mode, it is necessary that the NIC is transited from the energy saving mode to the normal mode to return the image forming apparatus from the energy saving mode to the normal mode so as only to acquire information of the image forming apparatus. For this reason, useless power consumption may occur as much as when the image forming apparatus is returned to the normal mode.

For example, according to the technique described in Japanese Patent Application Laid-open No. 2009-266088, in a case where the energy saving mode function is mounted in each of the image forming apparatus and the NIC, when the image forming apparatus is in the normal mode and the NIC is in the energy saving mode, the image forming apparatus may not provide information of the image forming apparatus to the NIC. Japanese Patent Application Laid-open No. 2009-266088 does not describe a problem regarding the occurrence of useless power consumption and cannot resolve this problem.

SUMMARY OF THE INVENTION

It is an object of the present invention to at least partially solve the problems in the conventional technology.

According to an aspect of the present invention, there is provided an image forming apparatus to which a network interface card is detachably connected and which operates in two modes of an energy saving mode and a normal mode. The image forming apparatus includes a shared memory that is capable of being referenced by the network interface card in the energy saving mode and the normal mode of the image forming apparatus; and an apparatus information saving unit that, when an apparatus state of the image forming apparatus is changed, saves image forming apparatus information regarding the apparatus state of the image forming apparatus in the shared memory. The network interface card includes an apparatus information acquisition unit that acquires the image forming apparatus information from the shared memory.

According to another aspect of the present invention, there is provided an image forming method performed in an image forming apparatus to which a network interface card is detachably connected and which operates in two modes of an energy saving mode and a normal mode. The image forming apparatus includes a shared memory capable of being referenced by the network interface card in the energy saving mode and the normal mode of the image forming apparatus. The image forming method includes saving, by the image forming apparatus, when an apparatus state of the image forming apparatus is changed, image forming apparatus information regarding the apparatus state of the image forming apparatus in the shared memory; and acquiring, by the network interface card, the image forming apparatus information from the shared memory.

According to still another aspect of the present invention, there is provided a computer program product comprising a non-transitory computer-usable medium having computer-readable program codes embodied in the medium for forming an image in an image forming apparatus to which a network interface card is detachably connected and which operates in two modes of an energy saving mode and a normal mode. The image forming apparatus includes a shared memory capable of being referenced by the network interface card in the energy saving mode and the normal mode of the image forming apparatus. The program codes when executed cause a computer to execute saving, by the image forming apparatus, when an apparatus state of the image forming apparatus is changed, image forming apparatus information regarding the apparatus state of the image forming apparatus in the shared memory; and acquiring, by the network interface card, the image forming apparatus information from the shared memory.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, preferred embodiments of an image forming apparatus according to the invention will be described in detail with reference to the accompanying drawings. It should be noted that the embodiments are not intended to limit the invention.

Outline of Embodiment of the Invention

Hereinafter, the outline of an embodiment of the invention will be described, and subsequently the configuration, processing, and the like of this embodiment will be described in detail with reference to FIGS. 1 to 12.

This embodiment schematically has the following basic features. That is, the image forming apparatus of this embodiment has detachably connected thereto a network interface card (NIC), and operates in two modes of an energy saving mode and a normal mode. The image forming apparatus includes a shared memory which is capable of being referenced by the network interface card in the energy saving mode and the normal mode of the image forming apparatus. In this embodiment, the shared memory may be a memory that allows writing by the image forming apparatus and allows reference by the network interface card.

Figure 1:
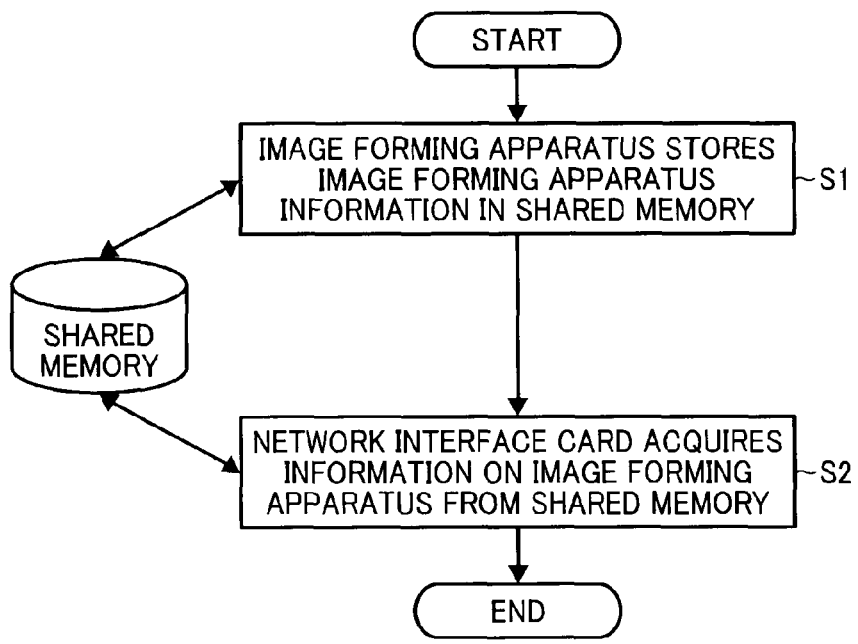
FIG. 1 is a flowchart showing an example of basic processing according to an embodiment of the invention.

Hereinafter, basic processing according to an embodiment of the invention will be described with reference to FIG. 1. FIG. 1 is a flowchart showing an example of basic processing according to an embodiment of the invention.

As shown in FIG. 1, first, when the apparatus state of the image forming apparatus is changed, the image forming apparatus stores image forming apparatus information regarding the apparatus state of the image forming apparatus in the shared memory (Step S1).

The image forming apparatus information may be information regarding the apparatus state which includes at least one of the state of the mode of the image forming apparatus, the state of error, the state of a residual ink quantity, the state of a counter, the state of a sheet feed tray, and the state of a sheet distribution tray. As an example, the state of the mode may be, for example, the state of the mode, such as the energy saving mode in which an energy saving state with low electricity consumption is set, the normal mode in which a normal state is set, and the like. The state of error may be, for example, the state of error, such as communication error, cartridge error, hard error, cassette error, cover open, and the like. The state of the residual ink quantity may be, for example, the state of the residual ink quantity, such as sufficient residual ink quantity, small residual ink quantity, no residual ink quantity, and the like. The state of the counter may be the state of a counter which indicates the total number of print pages, the number of printed pages, the number of pages to be printed, and the like. The state of the sheet feed tray may be, for example, the state of the sheet feed tray, such as sufficient residual sheet quantity, small residual sheet quantity, no sheet, and the like. The state of the sheet distribution tray may be, for example, the state of the sheet distribution tray representing a paper jam and the like.

In Step S1, when the apparatus state of the image forming apparatus is changed, the image forming apparatus may save the image forming apparatus information for a change amount, which has been updated compared to the image forming apparatus information stored in the shared memory, as differential information in the shared memory. Further, when the apparatus state of the image forming apparatus is changed, the image forming apparatus may save updating presence/absence information representing the presence/absence of updating of the image forming apparatus information and the image forming apparatus information in the shared memory.

The network interface card acquires the image forming apparatus information from the shared memory (Step S2). The network interface card may operate in two modes of an energy saving mode and a normal mode. When the mode of the network interface card is transited from the normal mode to the energy saving mode or when the mode of the network interface card is transited from the energy saving mode to the normal mode, the network interface card may acquire the image forming apparatus information from the shared memory.

In Step S2, the network interface card may acquire the differential information from the shared memory. The network interface card may reference the updating presence/absence information stored in the shared memory and, when it is determined that the image forming apparatus information has been updated, may acquire the image forming apparatus information from the shared memory.

As described above, in order to realize the improvement in the power saving effect of the image forming apparatus and the network interface card, when the apparatus state is changed, the image forming apparatus saves the image forming apparatus information regarding the apparatus state of the image forming apparatus in the shared memory which is capable of being referenced commonly by the image forming apparatus and the network interface card. Thus, in acquiring the image forming apparatus information, the network interface card references the shared memory which is capable of being commonly referenced, thus it is not necessary to perform communication with the image forming apparatus. As a result, even when the image forming apparatus is in the energy saving mode, the image forming apparatus does not need to be returned to the normal mode, making it possible to achieve power saving as much as power consumption when the image forming apparatus is transited from the energy saving mode to the normal mode.

When the apparatus state of the image forming apparatus is changed, the image forming apparatus saves, in the shared memory, the image forming apparatus information for a change amount, which has been updated compared to the image forming apparatus information stored in the shared memory, as the differential information. Further, when the apparatus state of the image forming apparatus is changed, the image forming apparatus stores the updating presence/absence information representing the presence/absence of updating of the image forming apparatus information and the image forming apparatus information in the shared memory. Thus, it is possible for the network interface to acquire the image forming apparatus information with a small amount of information. In this embodiment, the shared memory is a memory that allows writing by the image forming apparatus and allows reference by the network interface card, making it possible to realize an inexpensive device configuration.

Configuration of Image Forming System

Next, the configuration according to the embodiment of the invention will be described with reference to FIGS. 2 to 4.

Figure 2:
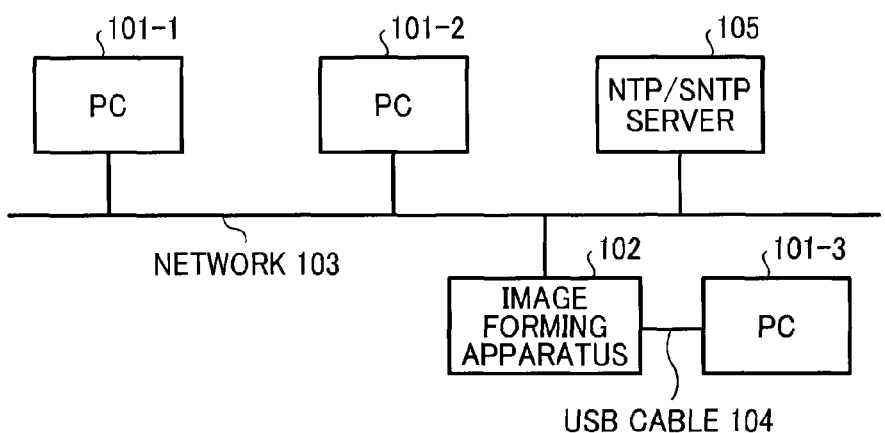
FIG. 2 is a diagram showing an example of the configuration of an image forming system according to an embodiment of the invention.

FIG. 2 is a diagram showing an example of an image forming system according to the embodiment of the invention. FIG. 3 is a functional block diagram showing an example of the configuration of an image forming apparatus 102 and a network interface card (network interface device) 206 according to the embodiment of the invention. FIG. 4 is a diagram showing an example of the overall configuration of the image forming apparatus 102 according to the embodiment of the invention. In this embodiment, FIGS. 2 to 4 conceptually show only a portion related to this embodiment from the relevant configuration.

First, an example of the configuration of the image forming system according to the embodiment of the invention will be described with reference to FIG. 2.

As shown in FIG. 2, in the image forming system, a plurality of PCs 101-1 to 101-3 and the image forming apparatus 102 are communicably connected through a network 103 and a USB cable 104. Referring to FIG. 2, print data which is created or processed by each of the PCs 101-1 to 101-3 is transmitted to the image forming apparatus 102 through the network 103 and the USB cable 104 and printed by the image forming apparatus 102. An NTP/SNTP server 105 may be communicably connected to the network 103 to correctly adjust the internal timepieces of the PCs 101-1 to 101-3 and the image forming apparatus 102 through the network 103.

Although in this embodiment, the image forming apparatus 102 having only a printer function will be described, the invention may be applied to any type of image forming apparatus, such as a copy machine, a scanner, a facsimile machine, or the like. The image forming apparatus 102 may be a multi-function image forming apparatus having at least two functions of a copy function, a printer function, a scanner function, and a facsimile function.

Configuration of Image Forming Apparatus and Network Interface Card

Next, an example of the configuration of the image forming apparatus 102 and the network interface card (NIC) 206 according to the embodiment of the invention will be described with reference to FIG. 3.

Figure 3:
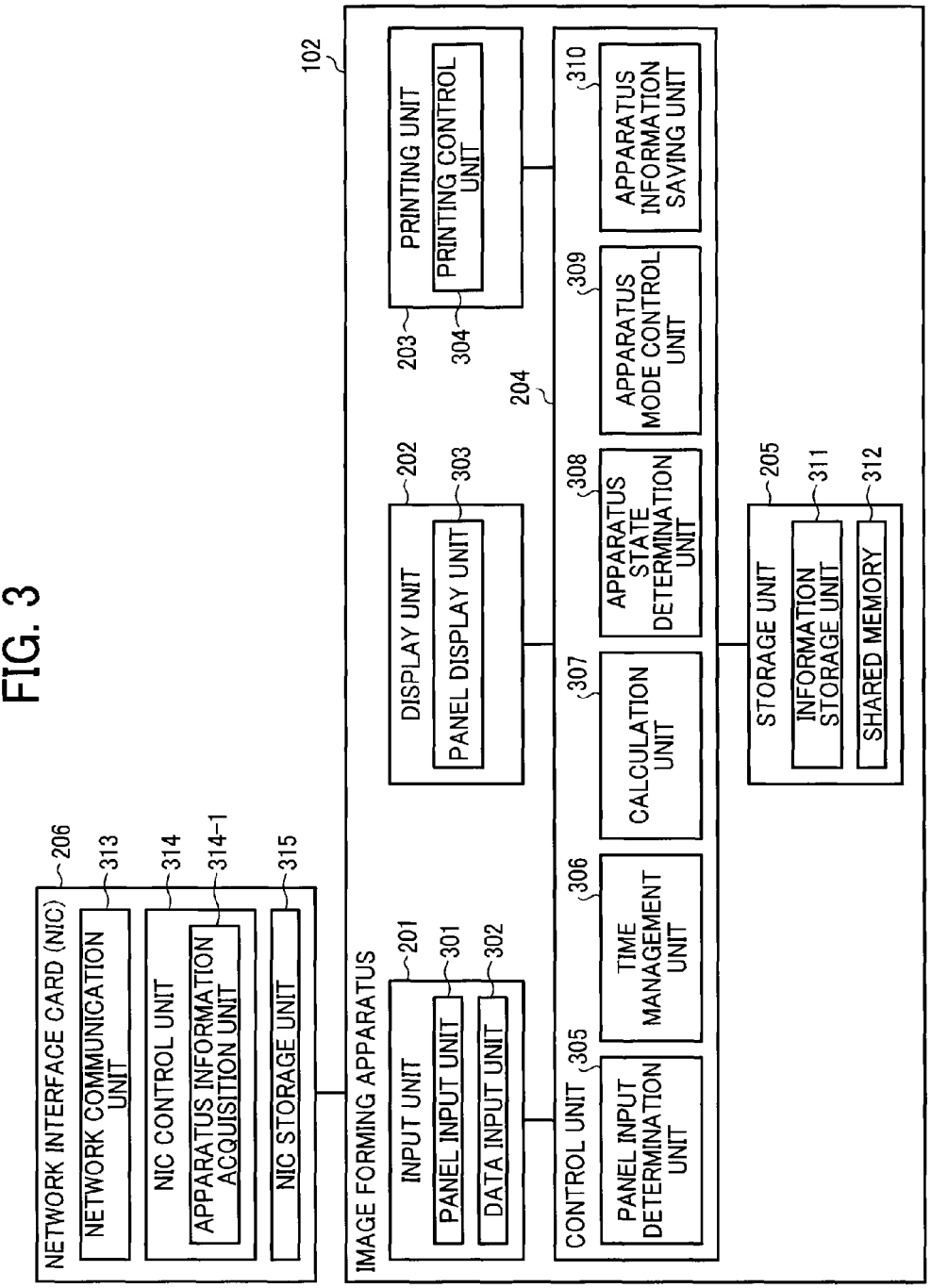
FIG. 3 is a functional block diagram showing an example of the configuration of an image forming apparatus and a network interface card according to an embodiment of the invention.

As shown in FIG. 3, the image forming apparatus 102 includes an input unit 201, a display unit 202, a printing unit 203, a control unit 204, and a storage unit 205.

Of these, the input unit 201 receives a user's operation from the user or receives print data. The input unit 201 includes a panel input unit 301 and a data input unit 302. Of these, the panel input unit 301 receives a user's operation from the user on the panel. The data input unit 302 receives data, such as print data, through the network 103 and the USB cable 104.

The display unit 202 is a display unit, such as a panel. The display unit 202 includes a panel display unit 303. The panel display unit 303 performs display on the panel.

The printing unit 203 performs printing on a recording medium (recording sheet or the like). The printing unit 203 includes a printing control unit 304. The printing control unit 304 prints print data on the recording medium.

The control unit 204 is a control unit, such as a CPU, which performs overall control of the image forming apparatus 102. The control unit 204 includes a panel input determination unit 305, a time management unit 306, a calculation unit 307, an apparatus state determination unit 308, an apparatus mode control unit 309, and an apparatus information saving unit 310. A real time clock (RTC) which is a chip exclusively for a timepiece may be mounted on the control unit 204.

Of these, the panel input determination unit 305 is a panel input determination unit which determines the content input from the panel.

The time management unit 306 manages time information from the NTP/SNTP server 105 sent from the data input unit 302 through the network 103 and time information from the RTC mounted on the control unit 204.

The calculation unit 307 is an arithmetic unit which calculates a standby time at the time of transition from the normal mode to the energy saving mode, or the like.

The apparatus state determination unit 308 determines whether the state of the image forming apparatus 102 is in the normal mode or the energy saving mode, or the like.

The apparatus state determination unit 308 may not only determine whether the state of the image forming apparatus 102 is in the normal mode or the energy saving mode, but also may determine the apparatus state including at least one of the state of error of the image forming apparatus 102, the state of the residual ink quantity, the state of the counter, the state of the sheet feed tray, and the state of the sheet distribution tray. As an example, the apparatus state determination unit 308 may determine whether or not the state of error is the state of, for example, communication error, cartridge error, hard error, cassette error, cover open, or the like. The apparatus state determination unit 308 may determine whether or not the state of the residual ink quantity is the state of, for example, sufficient residual ink quantity, small residual ink quantity, no residual ink quantity, or the like. The apparatus state determination unit 308 may determine the total number of print pages, the number of printed pages, the number of pages to be printed, or the like as the state of the counter. The apparatus state determination unit 308 may determine whether or not the state of the sheet feed tray is the state of, for example, sufficient residual sheet quantity, small residual sheet quantity, no sheet, or the like. The apparatus state determination unit 308 may determine whether or not the state of the sheet distribution tray is the state of, for example, a paper jam or the like.

The apparatus mode control unit 309 controls the mode of the apparatus, such as transition of the image forming apparatus 102 to the energy saving mode.

The apparatus information saving unit 310 saves, when the apparatus state of the image forming apparatus 102 is changed, image forming apparatus information regarding the apparatus state of the image forming apparatus 102 in a shared memory (common storage unit) 312. When the apparatus state of the image forming apparatus 102 is changed, the apparatus information saving unit 310 may save, in the shared memory 312, the image forming apparatus information for a change amount, which has been updated compared to the image forming apparatus information stored in the shared memory 312, as differential information. Further, when the apparatus state of the image forming apparatus 102 is changed, the apparatus information saving unit 310 may save updating presence/absence information representing the presence/absence of updating of the image forming apparatus information and the image forming apparatus information in the shared memory 312.

The image forming apparatus information may be information regarding the apparatus state which includes at least one of the state of the mode of the image forming apparatus 102, the state of error, the state of the residual ink quantity, the state of the counter, the state of the sheet feed tray, and the state of the sheet distribution tray. As an example, the state of the mode may be the state of a mode, such as the energy saving mode in which a standby state with low electricity consumption (a state where power supply is shut off or reduced with respect to at least a portion in the apparatus) is set, the normal mode in which a normal state (at the time of image formation standby, image formation, or the like) is set, or the like. The state of error may be the state of, for example, communication error, cartridge error, hard error, cassette error, cover open, or the like. The state of the residual ink quantity may be the state of the residual ink quantity, such as sufficient residual ink quantity, small residual ink quantity, no residual ink quantity, or the like. The state of the counter may be the state of a counter representing the total number of print pages, the number of printed pages, the number of pages to be printed, or the like. The state of the sheet feed tray may be the state of the sheet feed tray, such as sufficient residual sheet quantity, small residual sheet quantity, no sheet, or the like. The state of the sheet distribution tray may be the state of the sheet distribution tray representing, for example, a paper jam or the like.

The storage unit 205 is a storing unit, such as a read only memory (ROM) or a RAM, in which parameters or the like are recorded. The storage unit 205 includes an information storage unit 311 and the shared memory 312. Of these, the information storage unit 311 is an information storing unit in which information (for example, a standby time at the time of transition from the normal mode to the energy saving mode or the like) calculated by the calculation unit 307 is recorded. The shared memory (common storage unit) 312 is a common storing unit which is capable of being referenced by the network interface card 206 even when the mode of the image forming apparatus 102 is the energy saving mode. The shared memory 312 may be a memory that allows writing by the image forming apparatus 102 and allows reference by the network interface card 206.

As shown in FIG. 3, the network interface card (NIC) 206 which is a network input/output device may be detachably connected to the input unit 201 of the image forming apparatus 102. The network interface card 206 may operate in two modes of an energy saving mode and a normal mode.

The network interface card 206 includes a network communication unit 313, an NIC control unit 314, and an NIC storage unit 315. Of these, the network communication unit 313 is a network communication unit which performs communication with the network 103 from the network interface card 206. The NIC control unit 314 is an NIC control unit, such as a CPU, which controls the entire processing of the network interface card 206. The NIC storage unit 315 is an NIC storing unit, such as a ROM or a RAM, which stores network setting information of the network interface card 206 or the like. The NIC storage unit 315 may store the image forming apparatus information, the differential information, and the updating presence/absence information acquired from the shared memory 312 by an apparatus information acquisition unit 314-1 described below.

The NIC control unit 314 further includes the apparatus information acquisition unit 314-1. The apparatus information acquisition unit 314-1 acquires the image forming apparatus information from the shared memory 312. When the mode of the network interface card 206 is transited from the normal mode to the energy saving mode or when the mode of the network interface card 206 is transited from the energy saving mode to the normal mode, the apparatus information acquisition unit 314-1 may acquire the image forming apparatus information from the shared memory 312. The apparatus information acquisition unit 314-1 may acquire the differential information from the shared memory 312. The apparatus information acquisition unit 314-1 may reference the updating presence/absence information stored in the shared memory 312 and, when it is determined that the image forming apparatus information has been updated, may acquire the image forming apparatus information from the shared memory 312.

Subsequently, an example of the overall configuration of the general image forming apparatus 102 will be described with reference to FIG. 4.

Figure 4:
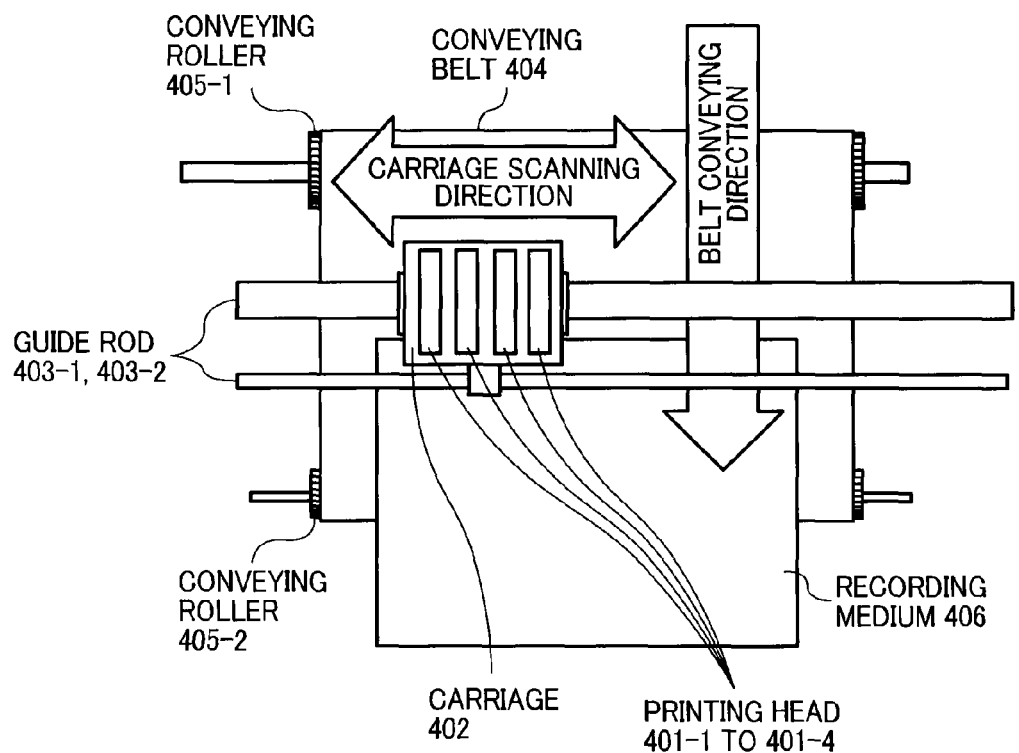
FIG. 4 is a diagram showing an example of the overall configuration of an image forming apparatus according to an embodiment of the invention.

As shown in FIG. 4, the image forming apparatus 102 includes printing heads (recording head) 401-1 to 401-4 which eject ink, a carriage 402 having the printing heads 401-1 to 401-4, guide rods 403-1 and 403-2 which support the carriage 402, a conveying belt 404 which conveys a recording medium 406 (recording sheet or the like), and conveying rollers 405-1 and 405-2 which drive the conveying belt 404.

The image forming apparatus 102 configured as above scans the carriage 402 so as to face the recording medium 406 along the guide rods 403-1 and 403-2 by the printing control unit 304 of the printing unit 203, and causes the printing heads 401-1 to 401-4 to eject ink, thereby recording print data on the recording medium 406. The image forming apparatus 102 drives the conveying belt 404 at each scanning of the carriage 402 by the printing control unit 304 of the printing unit 203 to convey the recording medium 406, thereby recording print data on the entire recording medium 406.

With the above, description of the configuration according to the embodiment of the invention is completed.

Processing of Image Forming Apparatus and Network Interface Card

Subsequently, an example of processing of the image forming apparatus 102 and the network interface card 206 of this embodiment configured as above will be described in detail with reference to FIGS. 5 to 12.

Hereinafter, a first embodiment (storage and acquisition of all kinds of image forming apparatus information), a second embodiment (storage and acquisition of differential information), and a third embodiment (storage and acquisition of updating presence/absence information) will be described separately.

First Example

In the first example, the image forming apparatus 102 stores all kinds of image forming apparatus information in the shared memory, and the network interface card 206 acquires all kinds of image forming apparatus information. This processing will be described with reference to FIGS. 5 to 8.

Figure 5:
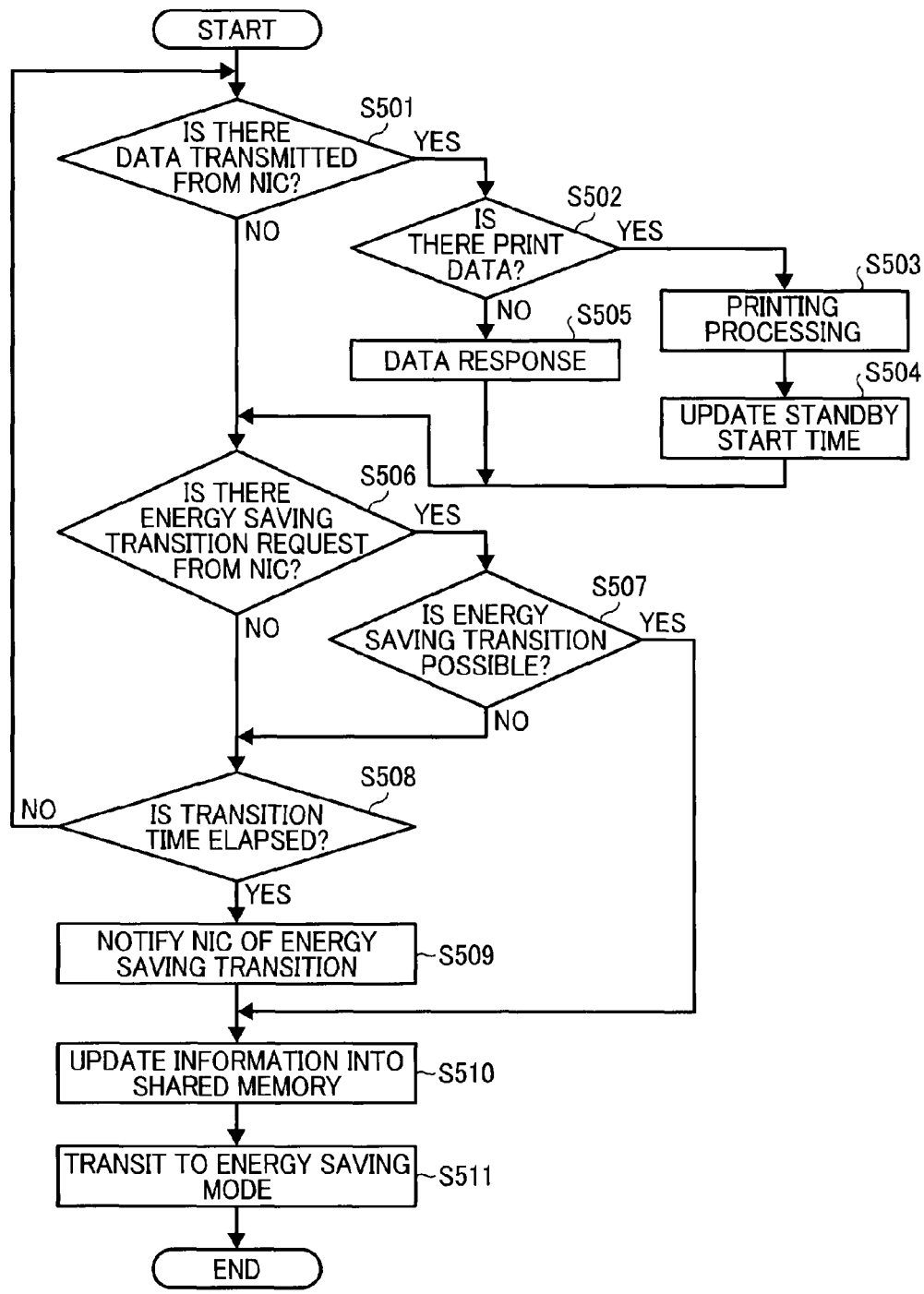
FIG. 5 is a flowchart showing an example of an energy saving mode transition processing procedure of an image forming apparatus according to a first example.
Figure 6:
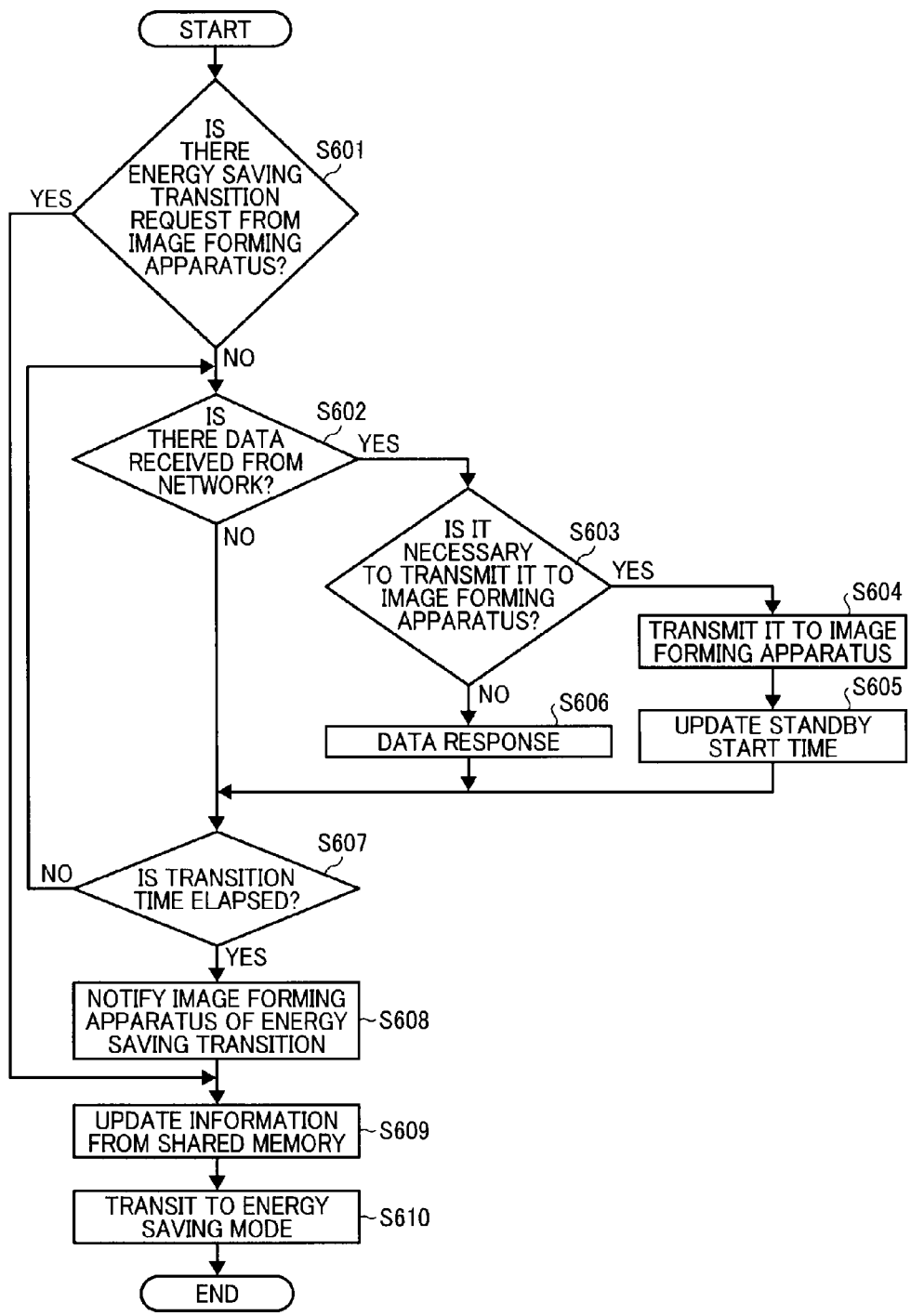
FIG. 6 is a flowchart showing an example of an energy saving mode transition processing procedure of a network interface card according to the first example.
Figure 7:
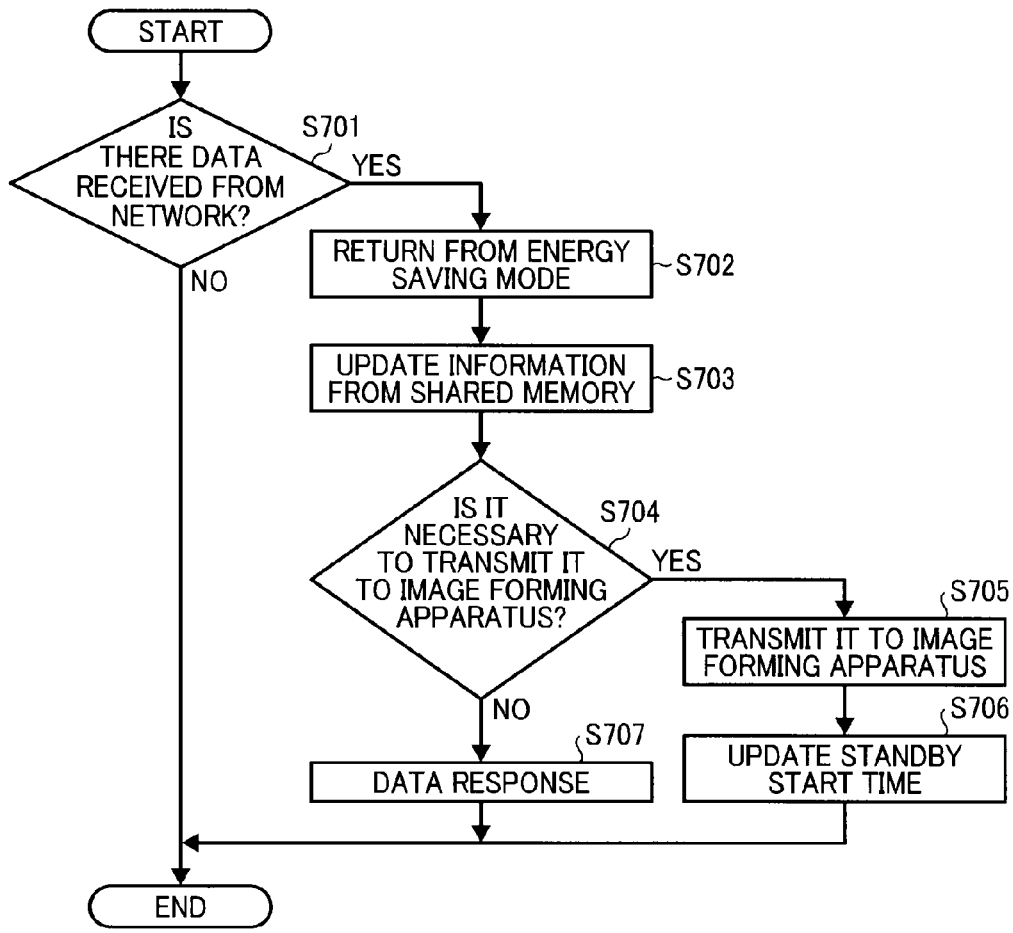
FIG. 7 is a flowchart showing an example of a normal mode transition processing procedure of a network interface card according to the first example.
Figure 8:
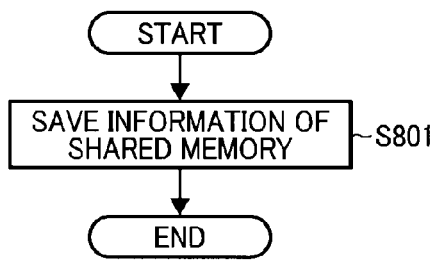
FIG. 8 is a flowchart showing an example of an information updating processing procedure from a shared memory according to the first example.

FIG. 5 is a flowchart showing an example of an energy saving mode transition processing procedure of the image forming apparatus 102 according to the first example. FIG. 6 is a flowchart showing an example of an energy saving mode transition processing procedure of the network interface card 206 according to the first example. FIG. 7 is a flowchart showing an example of a normal mode transition processing procedure of the network interface card 206 according to the first example. FIG. 8 is a flowchart showing an example of an information updating processing procedure from the shared memory according to the first example.

First, an example of the energy saving mode transition processing procedure of the image forming apparatus 102 according to the first example will be described with reference to FIG. 5.

As shown in FIG. 5, the control unit 204 of the image forming apparatus 102 determines whether or not there is data transmitted from the connected network interface card 206 through the network 103 (Step S501). Data transmission from the network interface card 206 to the image forming apparatus 102 may be carried out in Step S604 of FIG. 6 or Step S705 of FIG. 7 described below.

In Step S501, through the processing in the control unit 204 of the image forming apparatus 102, when it is determined that there is data transmission from the connected network interface card 206 through the network 103 (Step S501: Yes), the processing progresses to Step S502. Meanwhile, in Step S501, through the processing in the control unit 204 of the image forming apparatus 102, when it is determined that there is no data transmission from the connected network interface card 206 through the network 103 (Step S501: No), the processing progresses to Step S506.

The control unit 204 of the image forming apparatus 102 determines whether or not data transmitted from the network interface card 206 in Step S501 is print data (Step S502).

In Step S502, through the processing in the control unit 204 of image forming apparatus 102, when it is determined that data transmitted from the network interface card 206 in Step S501 is print data (Step S502: Yes), the processing progresses to Step S503. Meanwhile, in Step S502, through the processing in the control unit 204 of the image forming apparatus 102, when it is determined that data transmitted from the network interface card 206 in Step S501 is not print data (Step S502: No), the processing progresses to Step S505.

The printing unit 203 of the image forming apparatus 102 performs printing processing to print the print data transmitted from the network interface card 206 in Step S501 on the recording medium 406 (recording sheet or the like) through processing in the printing control unit 304 (Step S503).

The control unit 204 of the image forming apparatus 102 updates "standby start time" representing a time, at which standby starts in the normal mode, through processing in the calculation unit 307 (Step S504). That is, the measurement of the standby time at the time of transition from the normal mode to the energy saving mode starts with the standby start time as a starting point. Thereafter, the processing progresses to Step S506.

Returning to Step S502, through the processing in the control unit 204 of the image forming apparatus 102, when it is determined that data transmitted from the network interface card 206 in Step S501 is not print data (Step S502: No), the control unit 204 of the image forming apparatus 102 analyzes data transmitted from the network interface card 206 in Step S501 and performs response processing (Step S505). As an example, when transmitted data is a request to acquire image forming apparatus information, the control unit 204 of the image forming apparatus 102 may transmit the image forming apparatus information stored in the shared memory 312 to the network interface card 206.

The control unit 204 of the image forming apparatus 102 determines whether or not there is an energy saving mode transition request from the network interface card 206 in accordance with transition of the network interface card 206 to the energy saving mode (Step S506). The transmission of the energy saving mode transition request to the image forming apparatus 102 by the network interface card 206 is carried out in Step S608 of FIG. 6 described below.

In Step S506, through the processing in the control unit 204 of the image forming apparatus 102, when it is determined that there is an energy saving mode transition request from the network interface card 206 (Step S506: Yes), the processing progresses to Step S507. Meanwhile, in Step S506, through the processing in the control unit 204 of the image forming apparatus 102, when it is determined that there is no energy saving mode transition request from the network interface card 206 (Step S506: No), the processing progresses to Step S508.

The control unit 204 of the image forming apparatus 102 determines whether or not the state of the image forming apparatus 102 can be transited to the energy saving mode (Step S507). As an example, the control unit 204 of the image forming apparatus 102 may determine whether or not the transition to the energy saving mode is inhibited and when the transition to the energy saving mode is not inhibited, may determine that the state of the image forming apparatus 102 can be transited to the energy saving mode.

In Step S507, through the processing in the control unit 204 of the image forming apparatus 102, when it is determined that the state of the image forming apparatus 102 can be transited to the energy saving mode (Step S507: Yes), the processing progresses to Step S510. Meanwhile, in Step S507, through the processing in the control unit 204 of the image forming apparatus 102, when it is determined that the state of the image forming apparatus 102 cannot be transited to the energy saving mode (Step S507: No), the processing progresses to Step S508.

The control unit 204 of the image forming apparatus 102 compares the standby time measured through the processing of the calculation unit 307 in Step S504 with an energy saving mode transition time saved in the information storage unit 311 through processing in the time management unit 306 to determine whether or not the transition time has elapsed (Step S508).

In Step S508, through the processing in the time management unit 306, when it is determined that the transition time has elapsed in comparison of the standby time measured through the processing of the calculation unit 307 in the Step S504 with the energy saving mode transition time saved in the information storage unit 311 (Step S508: Yes), the processing progresses to Step S509. Meanwhile, in Step S508, through the processing in the time management unit 306, when it is determined that the transition time has not elapsed in comparison of the standby time measured through the processing of the calculation unit 307 in Step S504 with the energy saving mode transition time saved in the information storage unit 311 (Step S508: No), the processing returns to Step S501.

The control unit 204 of the image forming apparatus 102 notifies the network interface card 206 of the transition to the energy saving mode (Step S509). That is, the control unit 204 of the image forming apparatus 102 transmits an energy saving mode transition request to the network interface card 206.

The reception of the energy saving mode transition request from the image forming apparatus 102 by the network interface card 206 is carried out in Step S601 of FIG. 6 described below.

The control unit 204 of the image forming apparatus 102 saves the image forming apparatus information in the shared memory 312 to update information into the shared memory 312 through processing in the apparatus information saving unit 310 (Step S510). That is, when the apparatus state of the image forming apparatus 102 is changed, the apparatus information saving unit 310 saves the image forming apparatus information regarding the apparatus state of the image forming apparatus 102 in the shared memory 312.

The control unit 204 of the image forming apparatus 102 transits the mode of the image forming apparatus 102 from the normal mode to the energy saving mode through the processing in the apparatus mode control unit 309 (Step S511). Thereafter, the processing ends.

Next, an example of the energy saving mode transition processing procedure of the network interface card 206 according to the first example will be described with reference to FIG. 6.

As shown in FIG. 6, the NIC control unit 314 of the network interface card 206 determines whether or not there is an energy saving mode transition request from the image forming apparatus 102 in accordance with the transition of the image forming apparatus 102 to the energy saving mode (Step S601). The transmission of the energy saving mode transition request to the network interface card 206 by the image forming apparatus 102 is carried out in Step S509 of FIG. 5 described above.

In Step S601, through the processing in the NIC control unit 314 of the network interface card 206, when it is determined that there is an energy saving mode transition request from the image forming apparatus 102 (Step S601: Yes), the processing progresses to Step S609. Meanwhile, in Step S601, through the processing in the NIC control unit 314 of the network interface card 206, when it is determined that there is no energy saving mode transition request from the image forming apparatus 102 (Step S601: No), the processing progresses to Step S602.

The network communication unit 313 of the network interface card 206 determines whether or not data is received from the network 103 (Step S602).

In Step S602, through the processing in the network communication unit 313 of the network interface card 206, when it is determined that data is received from the network 103 (Step S602: Yes), the processing progresses to Step S603. Meanwhile, in Step S602, through the processing in the network communication unit 313 of the network interface card 206, when it is determined that no data is received from the network 103 (Step S602: No), the processing progresses to Step S607.

The NIC control unit 314 of the network interface card 206 determines whether or not data received from the network 103 is print data which should be transmitted to the image forming apparatus 102 (Step S603).

In Step S603, through the processing in the NIC control unit 314 of the network interface card 206, when it is determined that data received from the network 103 in Step S602 is print data which should be transmitted to the image forming apparatus 102 (Step S603: Yes), the processing progresses to Step S604. Meanwhile, in Step S603, through the processing in the NIC control unit 314 of the network interface card 206, when it is determined that data received from the network 103 in Step S602 is not print data which should be transmitted to the image forming apparatus 102 (Step S603: No), the processing progresses to Step S606.

The NIC control unit 314 of the network interface card 206 transmits print data to the image forming apparatus 102 (Step S604).

The NIC control unit 314 of the network interface card 206 updates the "standby start time" representing the time at which standby starts in the normal mode (Step S605). That is, the measurement of the standby time at the time of the transition from the normal mode to the energy saving mode starts with the standby start time as a starting point. Thereafter, the processing progresses to Step S607.

Returning to Step S603, through the processing in the NIC control unit 314 of the network interface card 206, when it is determined that data received from the network 103 in Step S602 is not print data which should be transmitted to the image forming apparatus 102 (Step S603: No), the NIC control unit 314 of the network interface card 206 analyzes data received from the network 103 in Step S602, and the network communication unit 313 of the network interface card 206 performs response processing (Step S606). As an example, when received data is a request to acquire image forming apparatus information, the network communication unit 313 of the network interface card 206 may transmit the image forming apparatus information stored in the shared memory 312 to the PCs 101-1 to 101-3 through the network 103.

The NIC control unit 314 of the network interface card 206 compares the standby time measured in Step S605 with the energy saving mode transition time saved in the information storage unit 311 to determine whether or not the transition time has elapsed (Step S607).

In Step S607, through the processing in the NIC control unit 314 of the network interface card 206, when it is determined that the transition time has elapsed in comparison of the standby time measured in Step S605 with the energy saving mode transition time saved in the information storage unit 311 (Step S607: Yes), the processing processes to Step S608. Meanwhile, in Step S607, through the processing in the NIC control unit 314 of the network interface card 206, when it is determined that the transition time has not elapsed in comparison of the standby time measured in Step S605 with the energy saving mode transition time saved in the information storage unit 311 (Step S607: No), the processing returns to Step S602.

The NIC control unit 314 of the network interface card 206 notifies the image forming apparatus 102 of the transition to the energy saving mode (Step S608). That is, the NIC control unit 314 of the network interface card 206 transmits an energy saving mode transition request to the image forming apparatus 102. The reception of the energy saving mode transition request from the network interface card 206 by the image forming apparatus 102 is carried out in Step S506 of FIG. 5 described above.

The NIC control unit 314 of the network interface card 206 acquires the image forming apparatus information saved in the shared memory 312 through processing in the apparatus information acquisition unit 314-1 and saves the image forming apparatus information in the NIC storage unit 315 to update information from the shared memory 312 (Step S609). That is, the apparatus information acquisition unit 314-1 acquires the image forming apparatus information from the shared memory 312. As described above, when the mode of the network interface card 206 is transited from the normal mode to the energy saving mode, the apparatus information acquisition unit 314-1 may acquire the image forming apparatus information from the shared memory 312.

The NIC control unit 314 of the network interface card 206 transits the mode of the network interface card 206 from the normal mode to the energy saving mode (Step S610). Thereafter, the processing ends.

Next, an example of the normal mode transition processing procedure of the network interface card 206 according to the first example will be described with reference to FIG. 7.

As shown in FIG. 7, the network communication unit 313 of the network interface card 206 determines whether or not data is received from the network 103 (Step S701).

In Step S701, through the processing in the network communication unit 313 of the network interface card 206, when it is determined that data is received from the network 103 (Step S701: Yes), the processing progresses to Step S702. Meanwhile, in Step S701, through the processing in the network communication unit 313 of the network interface card 206, when it is determined that no data is received from the network 103 (Step S701: No), the processing ends.

The NIC control unit 314 of the network interface card 206 transits the mode of the network interface card 206 from the energy saving mode to the normal mode, such that the network interface card 206 is returned from the energy saving mode (Step S702).

The NIC control unit 314 of the network interface card 206 acquires the image forming apparatus information saved in the shared memory 312 through the processing in the apparatus information acquisition unit 314-1 and saves the image forming apparatus information in the NIC storage unit 315 to update information from the shared memory 312 (Step S703). That is, the apparatus information acquisition unit 314-1 acquires the image forming apparatus information from the shared memory 312. As described above, when the mode of the network interface card 206 is transited from the energy saving mode to the normal mode, the apparatus information acquisition unit 314-1 may acquire the image forming apparatus information from the shared memory 312.

The NIC control unit 314 of the network interface card 206 determines whether or not data received from the network 103 in Step S701 is print data which should be transmitted to the image forming apparatus 102 (Step S704).

In Step S704, through the processing in the NIC control unit 314 of the network interface card 206, when it is determined that data received from the network 103 in Step S701 is print data which should be transmitted to the image forming apparatus 102 (Step S704: Yes), the processing progresses to Step S705. Meanwhile, in Step S704, through the processing in the NIC control unit 314 of the network interface card 206, when it is determined that data received from the network 103 in Step S701 is not print data which should be transmitted to the image forming apparatus 102 (Step S704: No), the processing progresses to Step S707.

The NIC control unit 314 of the network interface card 206 transmits print data to the image forming apparatus 102 (Step S705).

The NIC control unit 314 of the network interface card 206 updates the "standby start time" representing the time at which standby starts in the normal mode (Step S706). That is, the measurement of the standby time at the time of the transition from the normal mode to the energy saving mode starts with the standby time as a starting point. Thereafter, the processing ends.

Returning to Step S704, through the processing in the NIC control unit 314 of the network interface card 206, when it is determined that data received from the network 103 in Step S701 is not print data which should be transmitted to the image forming apparatus 102 (Step S704: No), the NIC control unit 314 of the network interface card 206 analyzes data received from the network 103 in Step S701, and the network communication unit 313 of the network interface card 206 performs response processing (Step S707). As an example, when received data is a request to acquire image forming apparatus information, the network communication unit 313 of the network interface card 206 may transmit the image forming apparatus information stored in the shared memory 312 to the PCs 101-1 to 101-3 through the network 103.

Next, an example of the information updating processing procedure from the shared memory according to the first example will be described with reference to FIG. 8. The processing of FIG. 8 corresponds to a processing procedure for "updating information from the shared memory," in which the image forming apparatus information is acquired from the shared memory and saved, in Step S609 of FIG. 6 and Step S703 of FIG. 7 described above.

As shown in FIG. 8, the NIC control unit 314 of the network interface card 206 acquires all kinds of image forming apparatus information from the shared memory 312 through the processing in the apparatus information acquisition unit 314-1 and saves the image forming apparatus information in the NIC storage unit 315 to save information of the shared memory 312 (Step S801). Therefore, even when the image forming apparatus 102 is in the energy saving mode, the network interface card 206 can acquire the image forming apparatus information from the shared memory 312.

Second Example

Figure 9:
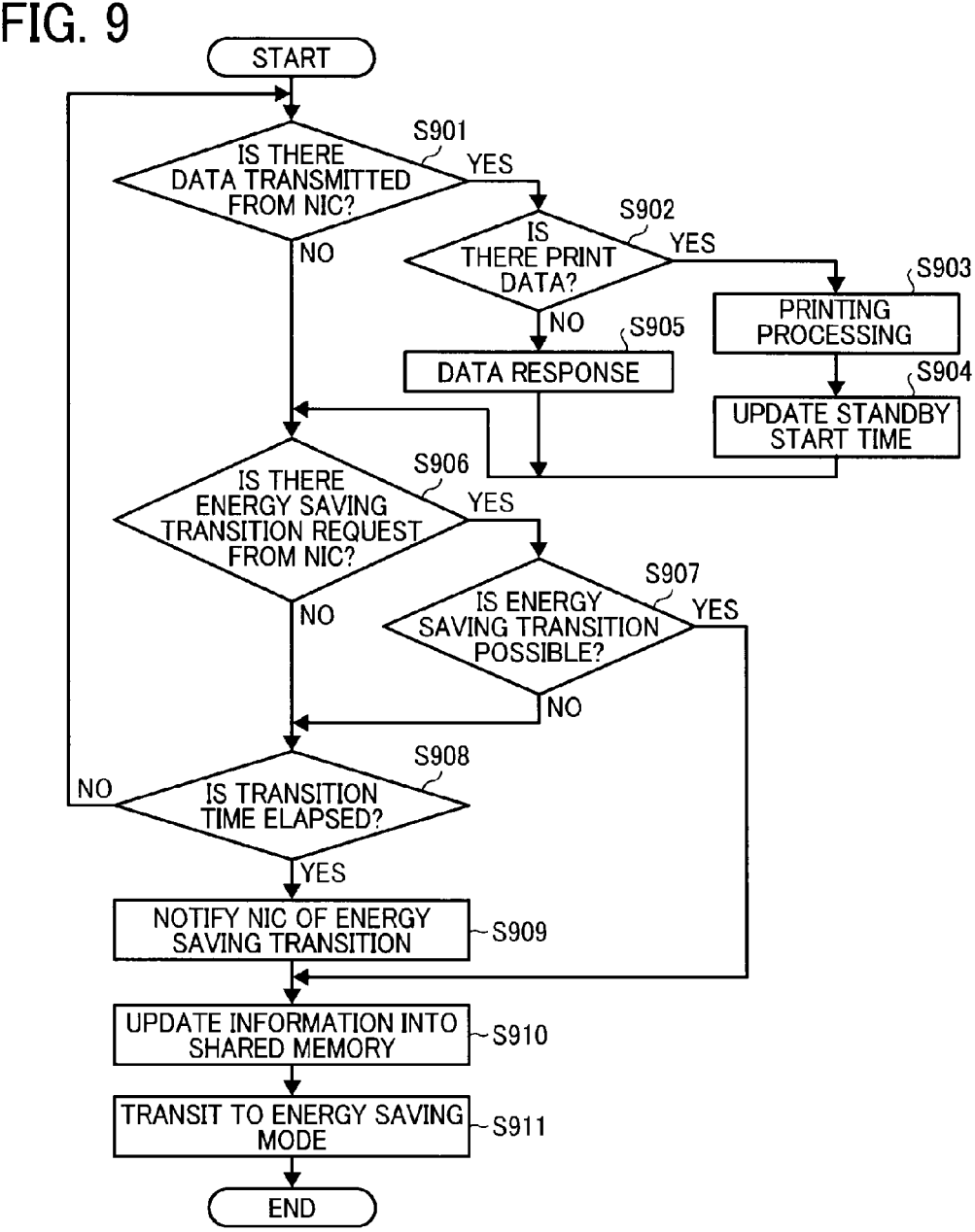
FIG. 9 is a flowchart showing an example of an energy saving mode transition processing procedure of an image forming apparatus according to a second example.
Figure 10:
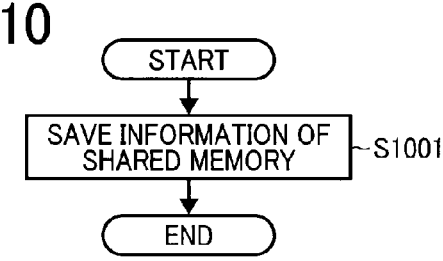
FIG. 10 is a flowchart showing an example of an information updating processing procedure from a shared memory according to the second example.

Subsequently, in the second example, the image forming apparatus 102 saves the differential information of the image forming apparatus information in the shared memory, and the network interface card 206 acquires the differential information of the image forming apparatus information. This processing will be described with reference to FIGS. 9 and 10. FIG. 9 is a flowchart showing an example of an energy saving mode transition processing procedure of the image forming apparatus 102 according to the second example. FIG. 10 is a flowchart showing an example of an information updating processing procedure from the shared memory according to the second example.

First, an example of the energy saving mode transition processing procedure of the image forming apparatus 102 according to the second example will be described with reference to FIG. 9.

The processing of FIG. 9 is basically the same as the processing in the energy saving mode transition processing procedure of the image forming apparatus 102 according to the first example shown in FIG. 5 described above, except that, in Step S910, the image forming apparatus 102 saves the differential information of the image forming apparatus information in the shared memory 312.

As shown in FIG. 9, the control unit 204 of the image forming apparatus 102 determines whether or not there is data transmission from the connected network interface card 206 through the network 103 (Step S901).

In Step S901, through the processing in the control unit 204 of the image forming apparatus 102, when it is determined that there is data transmission from the connected network interface card 206 through the network 103 (Step S901: Yes), the processing progresses to Step S902. Meanwhile, in Step S901, through the processing in the control unit 204 of the image forming apparatus 102, when it is determined that there is no data transmission from the connected network interface card 206 through the network 103 (Step S901: No), the processing progresses to Step S906.

The control unit 204 of the image forming apparatus 102 determines whether or not data transmitted from the network interface card 206 in Step S901 is print data (Step S902).

In Step S902, through the processing in the control unit 204 of image forming apparatus 102, when it is determined that data transmitted from the network interface card 206 in Step S901 is print data (Step S902: Yes), the processing progresses to Step S903. Meanwhile, in Step S902, through the processing in the control unit 204 of the image forming apparatus 102, when it is determined that data transmitted from the network interface card 206 in Step S901 is not print data (Step S902: No), the processing progresses to Step S905.

The printing unit 203 of the image forming apparatus 102 performs printing processing to print on print data transmitted from the network interface card 206 in Step S901 on the recording medium 406 (recording sheet or the like) through processing in the printing control unit 304 (Step S903).

The control unit 204 of the image forming apparatus 102 updates "standby start time" representing a time, at which standby starts in the normal mode, through processing in the calculation unit 307 (Step S904). That is, the measurement of the standby time at the time of transition from the normal mode to the energy saving mode starts with the standby start time as a starting point. Thereafter, the processing progresses to Step S906.

Returning to Step S902, through the processing in the control unit 204 of the image forming apparatus 102, when it is determined that data transmitted from the network interface card 206 in Step S901 is not print data (Step S902: No), the control unit 204 of the image forming apparatus 102 analyzes data transmitted from the network interface card 206 in Step S901 and performs response processing (Step S905). As an example, when transmitted data is a request to acquire image forming apparatus information, the control unit 204 of the image forming apparatus 102 may transmit the image forming apparatus information stored in the shared memory 312 to the network interface card 206.

The control unit 204 of the image forming apparatus 102 determines whether or not there is an energy saving mode transition request from the network interface card 206 in accordance with transition of the network interface card 206 to the energy saving mode (Step S906).

In Step S906, through the processing in the control unit 204 of the image forming apparatus 102, when it is determined that there is an energy saving mode transition request from the network interface card 206 (Step S906: Yes), the processing progresses to Step S907. Meanwhile, in Step S906, through the processing in the control unit 204 of the image forming apparatus 102, when it is determined that there is no energy saving mode transition request from the network interface card 206 (Step S906: No), the processing progresses to Step S908.

The control unit 204 of the image forming apparatus 102 determines whether or not the state of the image forming apparatus 102 can be transited to the energy saving mode (Step S907). As an example, the control unit 204 of the image forming apparatus 102 may determine whether or not the transition to the energy saving mode is inhibited and when the transition to the energy saving mode is not inhibited, may determine that the state of the image forming apparatus 102 can be transited to the energy saving mode.

In Step S907, through the processing in the control unit 204 of the image forming apparatus 102, when it is determined that the state of the image forming apparatus 102 can be transited to the energy saving mode (Step S907: Yes), the processing progresses to Step S910. Meanwhile, in Step S907, through the processing in the control unit 204 of the image forming apparatus 102, when it is determined that the state of the image forming apparatus 102 cannot be transited to the energy saving mode (Step S907: No), the processing progresses to Step S908.

The control unit 204 of the image forming apparatus 102 compares the standby time measured through the processing of the calculation unit 307 in Step S904 with an energy saving mode transition time save in the information storage unit 311 through processing in the time management unit 306 to determine whether or not the transition time has elapsed (Step S908).

In Step S908, through the processing in the time management unit 306, when it is determined that the transition time has elapsed in comparison of the standby time measured through the processing of the calculation unit 307 in the Step S904 with the energy saving mode transition time saved in the information storage unit 311 (Step S908: Yes), the processing progresses to Step S909. Meanwhile, in Step S908, through the processing in the time management unit 306, when it is determined that the transition time has not elapsed in comparison of the standby time measured through the processing of the calculation unit 307 in Step S904 with the energy saving mode transition time saved in the information storage unit 311 (Step S908: No), the processing progresses to Step S901.

The control unit 204 of the image forming apparatus 102 notifies the network interface card 206 of the transition to the energy saving mode (Step S909). That is, the control unit 204 of the image forming apparatus 102 transmits an energy saving mode transition request to the network interface card 206.

The control unit 204 of the image forming apparatus 102 saves only the image forming apparatus information, which has been updated compared to previous saving, in the shared memory 312 through the processing in the apparatus information saving unit 310 to update information into the shared memory 312 (Step S910). That is, when the apparatus state of the image forming apparatus 102 is changed, the apparatus information saving unit 310 stores the image forming apparatus information for a change amount, which has been updated compared to the image forming apparatus information stored in the shared memory 312, as differential information in the shared memory 312.

The control unit 204 of the image forming apparatus 102 transits the mode of the image forming apparatus 102 from the normal mode to the energy saving mode through the processing in the apparatus mode control unit 309 (Step S911). Thereafter, the processing ends.

The energy saving mode transition processing procedure and the normal mode transition processing procedure of the network interface card 206 according to the second example are basically the same as the processing in the energy saving mode transition processing procedure and the normal mode transition processing procedure of the image forming apparatus 102 according to the first example shown in FIGS. 6 and 7 described above, except that the network interface card 206 acquires the differential information of the image forming apparatus information from the shared memory 312, thus description thereof will not be repeated.

Next, an example of the information updating processing procedure from the shared memory according to the second example will be described with reference to FIG. 10. The processing of FIG. 10 is an example of a processing procedure for "updating information from the shared memory", in which the image forming apparatus information is acquired from the shared memory and saved, in the network interface card 206 according to the second example.

As shown in FIG. 10, the NIC control unit 314 of the network interface card 206 acquires the differential information of the image forming apparatus information saved in the shared memory 312 through the processing in the apparatus information acquisition unit 314-1 and saves the differential information in the NIC storage unit 315 to save information of the shared memory 312 (Step S1001). That is, the apparatus information acquisition unit 314-1 acquires the differential information from the shared memory 312. Therefore, even when the image forming apparatus 102 is in the energy saving mode, the network interface card 206 can acquire only the differential information of the image forming apparatus information from the shared memory 312, thereby acquiring the image forming apparatus information with a small amount of information.

Third Example

Figure 11:
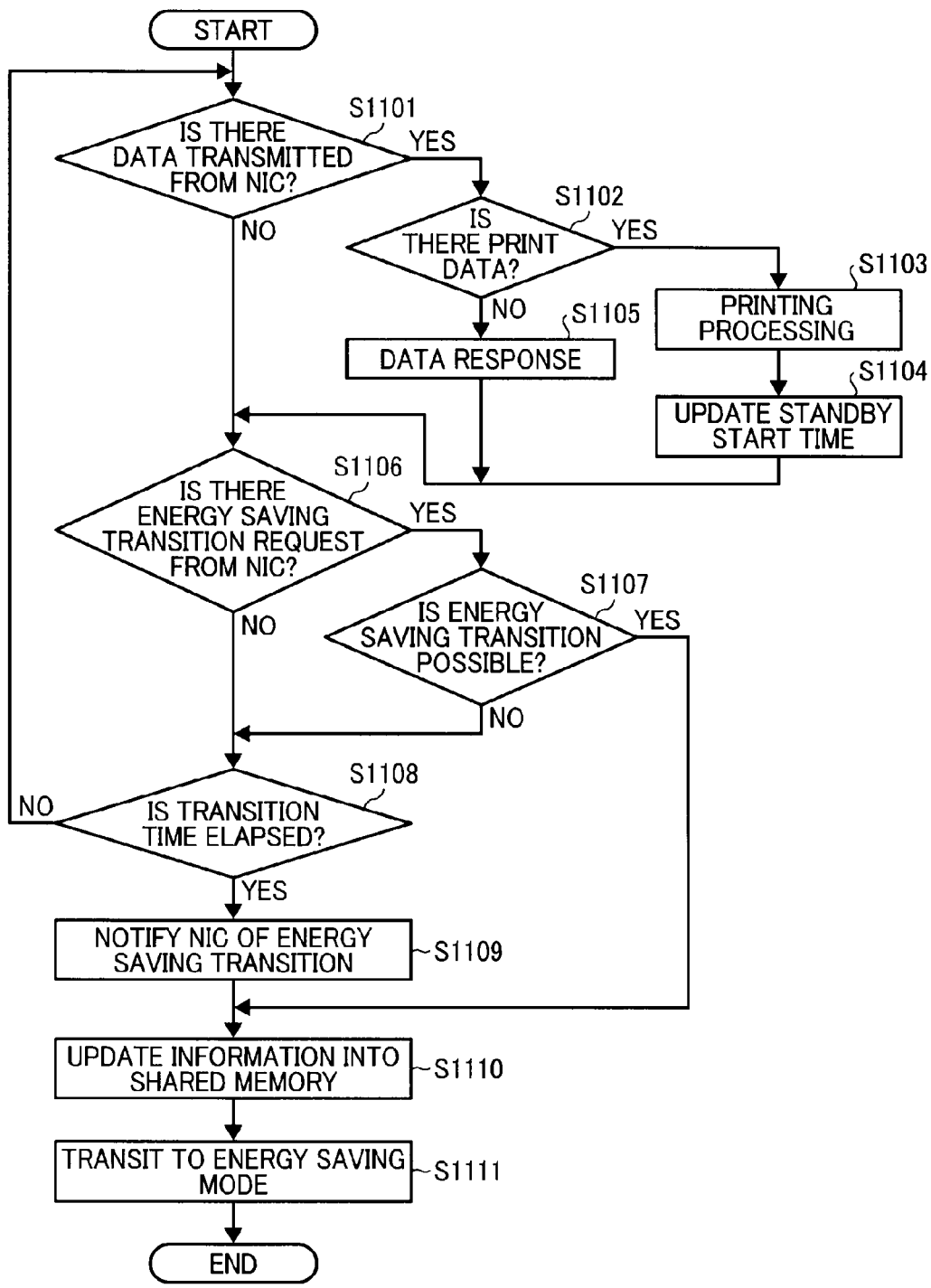
FIG. 11 is a flowchart showing an example of an energy saving mode transition processing procedure of an image forming apparatus according to a third example.
Figure 12:
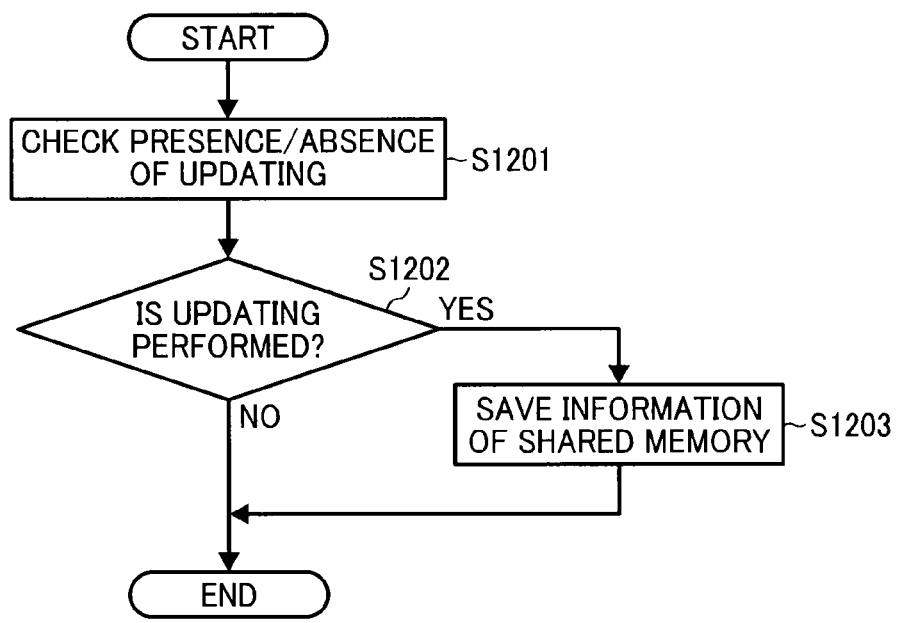
FIG. 12 is a flowchart showing an example of an information updating processing procedure from a shared memory from according to the third example.

Subsequently, in the example, the image forming apparatus 102 stores the updating presence/absence information of the image forming apparatus information and the image forming apparatus information in the shared memory 312, and the network interface card 206 references the updating presence/absence information of the shared memory 312 and, when it is determined that updating has been carried out, acquires the image forming apparatus information. This processing will be described with reference to FIGS. 11 and 12. FIG. 11 is a flowchart showing an example of an energy saving mode transition processing procedure of the image forming apparatus 102 according to the third example. FIG. 12 is a flowchart showing an example of an information updating processing procedure from the shared memory according to the third example.

First, an example of the energy saving mode transition processing procedure of the image forming apparatus 102 according to the third example will be described with reference to FIG. 11.

The processing of FIG. 11 is basically the same as the processing in the energy saving mode transition processing procedure of the image forming apparatus 102 according to the first example shown in FIG. 5 described above, except that, in Step S1110, the image forming apparatus 102 saves the updating presence/absence information of the image forming apparatus information and the image forming apparatus information in the shared memory 312.

As shown in FIG. 11, the control unit 204 of the image forming apparatus 102 determines whether or not there is data transmission from the connected network interface card 206 through the network 103 (Step S1101).

In Step S1101, through the processing in the control unit 204 of the image forming apparatus 102, when it is determined that there is data transmission from the connected network interface card 206 through the network 103 (Step S1101: Yes), the processing progresses to Step S1102. Meanwhile, in Step S1101, through the processing in the control unit 204 of the image forming apparatus 102, when it is determined that there is no data transmission from the connected network interface card 206 through the network 103 (Step S1101: No), the processing progresses to Step S1106.

The control unit 204 of the image forming apparatus 102 determines whether or not data transmitted from the network interface card 206 in Step S1101 is print data (Step S1102).

In Step S1102, through the processing in the control unit 204 of image forming apparatus 102, when it is determined that data transmitted from the network interface card 206 in Step S1101 is print data (Step S1102: Yes), the processing progresses to Step S1103. Meanwhile, in Step S1102, through the processing in the control unit 204 of the image forming apparatus 102, when it is determined that data transmitted from the network interface card 206 in Step S1101 is not print data (Step S1102: No), the processing progresses to Step S1105.

The printing unit 203 of the image forming apparatus 102 performs printing processing to print the print data transmitted from the network interface card 206 in Step S1101 on the recording medium 406 (recording sheet or the like) through processing in the printing control unit 304 (Step S1103).

The control unit 204 of the image forming apparatus 102 updates "standby start time" representing a time, at which standby starts in the normal mode, through processing in the calculation unit 307 (Step S1104). That is, the measurement of the standby time at the time of transition from the normal mode to the energy saving mode starts with the standby start time as a starting point. Thereafter, the processing progresses to Step S1106.

Returning to Step S1102, through the processing in the control unit 204 of the image forming apparatus 102, when it is determined that data transmitted from the network interface card 206 in Step S1101 is not print data (Step S1102: No), the control unit 204 of the image forming apparatus 102 analyzes data transmitted from the network interface card 206 in Step S1101 and performs response processing (Step S1105). As an example, when transmitted data is a request to acquire image forming apparatus information, the control unit 204 of the image forming apparatus 102 may transmit the image forming apparatus information stored in the shared memory 312 to the network interface card 206.

The control unit 204 of the image forming apparatus 102 determines whether or not there is an energy saving mode transition request from the network interface card 206 in accordance with transition of the network interface card 206 to the energy saving mode (Step S1106).

In Step S1106, through the processing in the control unit 204 of the image forming apparatus 102, when it is determined that there is an energy saving mode transition request from the network interface card 206 (Step S1106: Yes), the processing progresses to Step S1107. Meanwhile, in Step S1106, through the processing in the control unit 204 of the image forming apparatus 102, when it is determined that there is no energy saving mode transition request from the network interface card 206 (Step S1106: No), the processing progresses to Step S1108.

The control unit 204 of the image forming apparatus 102 determines whether or not the state of the image forming apparatus 102 can be transited to the energy saving mode (Step S1107). As an example, the control unit 204 of the image forming apparatus 102 may determine whether or not the transition to the energy saving mode is inhibited and when the transition to the energy saving mode is not inhibited, may determine that the state of the image forming apparatus 102 can be transited to the energy saving mode.

In Step S1107, through the processing in the control unit 204 of the image forming apparatus 102, when it is determined that the state of the image forming apparatus 102 can be transited to the energy saving mode (Step S1107: Yes), the processing progresses to Step S1110. Meanwhile, in Step S1107, through the processing in the control unit 204 of the image forming apparatus 102, when it is determined that the state of the image forming apparatus 102 cannot be transited to the energy saving mode (Step S1107: No), the processing progresses to Step S1108.

The control unit 204 of the image forming apparatus 102 compares the standby time measured through the processing of the calculation unit 307 in Step S1104 with an energy saving mode transition time save in the information storage unit 311 through processing in the time management unit 306 to determine whether or not the transition time has elapsed (Step S1108).

In Step S1108, through the processing in the time management unit 306, when it is determined that the transition time has elapsed in comparison of the standby time measured through the processing of the calculation unit 307 in the Step S1104 with the energy saving mode transition time saved in the information storage unit 311 (Step S1108: Yes), the processing progresses to Step S1109. Meanwhile, in Step S1108, through the processing in the time management unit 306, when it is determined that the transition time has not elapsed in comparison of the standby time measured through the processing of the calculation unit 307 in Step S1104 with the energy saving mode transition time saved in the information storage unit 311 (Step S1108: No), the processing progresses to Step S1101.

The control unit 204 of the image forming apparatus 102 notifies the network interface card 206 of the transition to the energy saving mode (Step S1109). That is, the control unit 204 of the image forming apparatus 102 transmits an energy saving mode transition request to the network interface card 206.

The control unit 204 of the image forming apparatus 102 saves the updating presence/absence information representing that updating has been carried out compared to previous saving, and the image forming apparatus information in the shared memory 312 through the processing in the apparatus information saving unit 310 to update information into the shared memory 312 (Step S1110). That is, when the apparatus state of the image forming apparatus 102 is changed, the apparatus information saving unit 310 stores the updating presence/absence information representing the presence/absence of updating of the image forming apparatus information and the image forming apparatus information in the shared memory 312.

The control unit 204 of the image forming apparatus 102 transits the mode of the image forming apparatus 102 from the normal mode to the energy saving mode through the processing in the apparatus mode control unit 309 (Step S1111). Thereafter, the processing ends.

The energy saving mode transition processing procedure and the normal mode transition processing procedure of the network interface card 206 according to the third example are basically the same as the processing in the energy saving mode transition processing procedure and the normal mode transition processing procedure of the image forming apparatus 102 according to the first example shown in FIGS. 6 and 7 described above, except that the network interface card 206 references the updating presence/absence information of the shared memory 312 and, when it is determined that updating has been carried out, acquires the image forming apparatus information, thus description thereof will not be repeated.

Next, an example of the information updating processing procedure from the shared memory according to the third example will be described with reference to FIG. 12. The processing of FIG. 12 is an example of a processing procedure for "updating information from the shared memory", in which the image forming apparatus information is acquired from the shared memory and saved, in the network interface card 206 according to the third example.

As shown in FIG. 12, the NIC control unit 314 of the network interface card 206 acquires the updating presence/absence information of the image forming apparatus information saved in the shared memory 312 through the processing in the apparatus information acquisition unit 314-1 to check the updating presence/absence state (Step S1201).

The NIC control unit 314 of the network interface card 206 determines whether or not the image forming apparatus information is updated on the basis of the updating presence/absence information acquired in Step S1201 through the processing in the apparatus information acquisition unit 314-1 (Step S1202).

When it is determined on the basis of the updating presence/absence information acquired in Step S1201 through the processing in the apparatus information acquisition unit 314-1 that the image forming apparatus information is updated (Step S1202: Yes), the processing progresses to Step S1203. Meanwhile, when it is determined on the basis of the updating presence/absence information acquired in Step S1201 through the processing in the apparatus information acquisition unit 314-1 that the image forming apparatus information is not updated (Step S1202: No), thereafter, the processing ends.

The NIC control unit 314 of the network interface card 206 acquires the image forming apparatus information saved in the shared memory 312 through the processing in the apparatus information acquisition unit 314-1 and saves the image forming apparatus information in the NIC storage unit 315 to save information of the shared memory 312 (Step S1203).

As described above, the apparatus information acquisition unit 314-1 references the updating presence/absence information stored in the shared memory 312 and, when it is determined that the image forming apparatus information has been updated, acquires the image forming apparatus information from the shared memory 312. Therefore, even when the image forming apparatus 102 is in the energy saving mode, the network interface card 206 can reference only the updating presence/absence information of the image forming apparatus information from the shared memory 312 and, only when updating has been carried out, can acquire the image forming apparatus information, thereby acquiring the image forming apparatus information with a small amount of information.

With the above, description of the processing according to the embodiment of the invention is completed.

In the foregoing embodiment, the image forming apparatus 102 and the network interface card 206 realize the functions related to the invention by executing a program which is incorporated in, for example, a ROM in advance. The program which is executed by the image forming apparatus 102 and the network interface card 206 has a module configuration which includes a program for realizing the above-described units in the image forming apparatus 102 and the network interface card 206. As actual software, the CPU (processor) reads the program from the ROM and executes the program to load the program for realizing the above-described units on a main storage device, such that the above-described units are realized.

The program which is executed by the image forming apparatus 102 and the network interface card 206 of the foregoing embodiment may be recorded in a computer-readable recording medium, such as a CD-ROM, a flexible disk (FD), a CD-R, a digital versatile disk (DVD), in the form of files in installable or executable format.

The program which is executed by the image forming apparatus 102 and the network interface card 206 of the foregoing embodiment may be stored in a computer connected to a network, such as Internet, and downloaded through the network. The program which is executed by the image forming apparatus 102 and the network interface card 206 of the foregoing embodiment may be provided or distributed through a network, such as Internet.

According to the invention, in the image forming apparatus to which the network interface card (NIC) is detachably connected and which operates in two modes of an energy saving mode and a normal mode, when the apparatus state of the image forming apparatus is changed, the image forming apparatus information regarding the apparatus state of the image forming apparatus is stored in the shared memory which is capable of being referenced by the network interface card in the energy saving mode and the normal mode of the image forming apparatus. The network interface card acquires the image forming apparatus information from the shared memory. Thus, when the network interface card acquires information of the image forming apparatus, even when the image forming apparatus is in the energy saving mode, it is possible to acquire information of the image forming apparatus without returning the image forming apparatus to the normal mode. Therefore, according to the invention, it is possible to reduce power consumption as much as when the image forming apparatus is returned to the normal mode.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus to which a network interface card is detachably connected and which operates in two modes of an energy saving mode and a normal mode, the image forming apparatus comprising:
    a shared memory that is accessible by the network interface card in the energy saving mode and the normal mode of the image forming apparatus;
    an apparatus state determination unit that determines image forming apparatus information including whether the image forming apparatus is in the normal mode or in the energy saving mode and including at least one of a state of error, a state of residual ink quantity, a state of a counter, a state of a sheet feed tray, and a state of a sheet distribution tray; and
    an apparatus information saving unit that
        when the image forming apparatus changes from the normal mode to the energy saving mode, saves the image forming apparatus information determined by the apparatus state determination unit in the shared memory that is accessible both in the energy saving mode and the normal mode of the image forming apparatus, and
        when the image forming apparatus changes from the energy saving mode to the normal mode, saves the image forming apparatus information determined by the apparatus state determination unit in the shared memory that is accessible both in the energy saving mode and the normal mode of the image forming apparatus,
    wherein the network interface card includes an apparatus information acquisition unit that acquires the image forming apparatus information from the shared memory.

2. The image forming apparatus according to claim 1, wherein
    the network interface card operates in two modes of an energy saving mode and a normal mode, and
    when the mode of the network interface card is transited from the normal mode to the energy saving mode or when the mode of the network interface card is transited from the energy saving mode to the normal mode, the apparatus information acquisition unit acquires the image forming apparatus information from the shared memory.

3. The image forming apparatus according to claim 1, wherein
    when the image forming apparatus changes between the normal mode and the energy saving mode, the apparatus information saving unit saves, in the shared memory, the image forming apparatus information for a change amount, which has been updated compared to the image forming apparatus information stored in the shared memory, as differential information, and
    the apparatus information acquisition unit acquires the differential information from the shared memory.

4. The image forming apparatus according to claim 1, wherein
    when the image forming apparatus changes between the normal mode and the energy saving mode, the apparatus information saving unit saves updating presence/absence information representing the presence/absence of updating of the image forming apparatus information and the image forming apparatus information in the shared memory, and
    the apparatus information acquisition unit references the updating presence/absence information stored in the shared memory and, when it is determined that the image forming apparatus information has been updated, acquires the image forming apparatus information from the shared memory.

5. The image forming apparatus according to claim 1, wherein the shared memory is a memory that allows writing by the image forming apparatus and allows reference by the network interface card.

6. The image forming apparatus according to claim 1, wherein the apparatus state determination unit determines the image forming apparatus information, which includes whether the image forming apparatus is in the normal mode or in the energy saving mode and includes a communication error.

7. The image forming apparatus according to claim 1, wherein the apparatus information acquisition unit of the network interface card acquires the image forming information from the shared memory without performing communication with the image forming apparatus.

8. The image forming apparatus according to claim 1, wherein the apparatus information acquisition unit of the network interface card acquires the image forming information from the shared memory when the image forming apparatus is in the energy saving mode.

9. An image forming method performed in an image forming apparatus to which a network interface card is detachably connected and which operates in two modes of an energy saving mode and a normal mode and includes a shared memory accessible by the network interface card in the energy saving mode and the normal mode of the image forming apparatus,
    the image forming method comprising:
    determining image forming apparatus information including whether the image forming apparatus is in the normal mode or in the energy saving mode and including at least one of a state of error, a state of residual ink quantity, a state of a counter, a state of a sheet feed tray, and a state of a sheet distribution tray;
    saving, by the image forming apparatus, when the image forming apparatus changes from the normal mode to the energy saving mode, the determined image forming apparatus information in the shared memory that is accessible both in the energy saving mode and the normal mode of the image forming apparatus;

saving, by the image forming apparatus, when the image forming apparatus changes from the energy saving mode to the normal mode, the determined image forming apparatus information in the shared memory that is accessible both in the energy saving mode and the normal mode of the image forming apparatus; and acquiring, by the network interface card, the image forming apparatus information from the shared memory.

10. The image forming method according to claim 9, wherein the network interface card operates in two modes of an energy saving mode and a normal mode, and in the acquiring, when the mode of the network interface card is transited from the normal mode to the energy saving mode or when the mode of the network interface card is transited from the energy saving mode to the normal mode, the image forming apparatus information is acquired from the shared memory.

11. The image forming method according to claim 9, wherein in the saving, when the image forming apparatus changes between the normal mode and the energy saving mode, the image forming apparatus information for a change amount, which has been updated compared to the image forming apparatus information stored in the shared memory, is saved in the shared memory as differential information, and in the acquiring, the differential information is acquired from the shared memory.

12. The image forming method according to claim 9, wherein in the saving, when the image forming apparatus changes between the normal mode and the energy saving mode, updating presence/absence information representing the presence/absence of updating of the image forming apparatus information and the image forming apparatus information is saved in the shared memory, and in the acquiring, the updating presence/absence information stored in the shared memory is referenced and, when it is determined that the image forming apparatus information has been updated, the image forming apparatus information is acquired from the shared memory.

13. The image forming method according to claim 9, wherein the shared memory is a memory that allows writing by the image forming apparatus and allows reference by the network interface card.

14. A computer program product comprising a non-transitory computer-usable medium having computer-readable program codes embodied in the medium for forming an image in an image forming apparatus to which a network interface card is detachably connected and which operates in two modes of an energy saving mode and a normal mode and includes a shared memory accessible by the network interface card in the energy saving mode and the normal mode of the image forming apparatus, the program codes when executed causing a computer to execute:

determining image forming apparatus information including whether the image forming apparatus is in the normal mode or in the energy saving mode and including at least one of a state of error, a state of residual ink quantity, a state of a counter, a state of a sheet feed tray, and a state of a sheet distribution tray;

saving, by the image forming apparatus, when the image forming apparatus changes from the normal mode to the energy saving mode, the determined image forming apparatus information in the shared memory that is accessible both in the energy saving mode and the normal mode of the image forming apparatus;

saving, by the image forming apparatus, when the image forming apparatus changes from the energy saving mode to the normal mode, the determined image forming apparatus information in the shared memory that is accessible both in the energy saving mode and the normal mode of the image forming apparatus; and acquiring, by the network interface card, the image forming apparatus information from the shared memory.

15. The computer program product according to claim 14, wherein the network interface card operates in two modes of an energy saving mode and a normal mode, and in the acquiring, when the mode of the network interface card is transited from the normal mode to the energy saving mode or when the mode of the network interface card is transited from the energy saving mode to the normal mode, the image forming apparatus information is acquired from the shared memory.

16. The computer program product according to claim 14, wherein in the saving, when the image forming apparatus changes between the normal mode and the energy saving mode, the image forming apparatus information for a change amount, which has been updated compared to the image forming apparatus information stored in the shared memory, is saved in the shared memory as differential information, and in the acquiring, the differential information is acquired from the shared memory.

17. The computer program product according to claim 14, wherein in the saving, when the image forming apparatus changes between the normal mode and the energy saving mode, updating presence/absence information representing the presence/absence of updating of the image forming apparatus information and the image forming apparatus information is saved in the shared memory, and in the acquiring, the updating presence/absence information stored in the shared memory is referenced and, when it is determined that the image forming apparatus information has been updated, the image forming apparatus information is acquired from the shared memory.

18. The computer program product according to claim 14, wherein the shared memory is a memory that allows writing by the image forming apparatus and allows reference by the network interface card.

* * * * *